United States Patent
Kleinstück et al.

(10) Patent No.: US 6,743,372 B1
(45) Date of Patent: Jun. 1, 2004

(54) MEDIA FOR WATER TREATMENT

(75) Inventors: Roland Kleinstück, Bergisch Gladbach (DE); Torsten Groth, Odenthal (DE); Winfried Joentgen, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/762,800

(22) PCT Filed: Aug. 4, 1999

(86) PCT No.: PCT/EP99/05640

§ 371 (c)(1), (2), (4) Date: Feb. 13, 2001

(87) PCT Pub. No.: WO00/10928

PCT Pub. Date: Mar. 2, 2000

(30) Foreign Application Priority Data

Aug. 17, 1998 (DE) .......................................... 198 37 068

(51) Int. Cl.⁷ ........................... C02F 5/10; A01N 59/08; A01N 41/06

(52) U.S. Cl. ............. 252/181; 252/186.29; 252/186.36; 424/661

(58) Field of Search ............................ 252/181, 186.29, 252/186.36; 424/661

(56) References Cited

U.S. PATENT DOCUMENTS

| | | | |
|---|---|---|---|
| 3,170,883 A | | 2/1965 | Owen et al. |
| 3,864,271 A | * | 2/1975 | Stalter |
| 4,642,194 A | | 2/1987 | Johnson ...................... 210/699 |
| 4,711,724 A | | 12/1987 | Johnson ...................... 210/699 |
| 4,759,852 A | | 7/1988 | Trulear ...................... 210/699 |
| 4,983,315 A | * | 1/1991 | Glogowski et al. . 252/186.29 X |
| 5,433,886 A | * | 7/1995 | Sherbondy et al. ..... 252/181 X |
| 5,683,654 A | * | 11/1997 | Dallmier et al. .... 252/186.36 X |
| 5,911,909 A | * | 6/1999 | Coyle-Rees ........ 252/186.36 X |

FOREIGN PATENT DOCUMENTS

| | | |
|---|---|---|
| EP | 0 569 220 | 11/1993 |
| GB | 1584170 | 2/1981 |
| WO | 97/39078 | 10/1997 |

* cited by examiner

*Primary Examiner*—Daniel S. Metzmaier
(74) *Attorney, Agent, or Firm*—Godfried R. Akorli; Diderico van Eyl

(57) ABSTRACT

The present invention relates to compositions for water treatment based on biodegradable polymers containing repeating succinyl units, biocidal oxidizing agents and unsubstituted or substituted amidosulphonic acid, their use in, and the process for, conditioning water of cooling circuits.

5 Claims, No Drawings

MEDIA FOR WATER TREATMENT

This application is a 371 of PCT/EP 99/05640, filed Aug. 4, 1999.

BACKGROUND

The present invention relates to compositions for water treatment based on biodegradable polymers containing repeating succinyl units, biocidal oxidizing agents and a substituted or unsubstituted amidosulphonic acid; their use in, and the process for, conditioning water of cooling circuits.

When natural waters are used for industrial purposes, for example as cooling water, the water used is changed physically and/or possibly also chemically specifically or unintentionally. Thus, for example in open recirculating cooling systems, temperature changes, concentration and a pH increase due to the discharge of carbon dioxide in the cooling tower are unavoidable.

Due to the concentration and increase in pH from the discharge of $CO_2$, the concentration of hardness constituents, in particular calcium ions and carbonate ions, increases. If the natural waters were in equilibrium before use (lime-carbon dioxide equilibrium), an increase in concentration of the hardness constituents leads to supersaturation. To prevent scale deposition (encrustations), in particular on heat-transfer surfaces, treatment of the waters by addition of additives ("scale inhibitors") is necessary.

A further, sometimes even the predominant, purpose of the use of additives in water treatment is protection of metallic materials against corrosion. For example, when unalloyed carbon steels are used in open recirculating cooling systems, adequate corrosion inhibition is desired, since the conditions prevailing in such systems (oxygen saturation, salt accumulation) lead to an acceleration of corrosion.

WO 97/39078 proposes the use of biodegradable polymers, such as, for example, polyaspartic acid, or other aspartic-acid-containing polymers in combination with biocidally acting oxidizing agents to condition water in, cooling circuits.

Descriptions are given, inter alia, of experiments in which 10 mg/l of polyaspartic acid having a molecular weight of about 3000 were tested in the presence of 0.4 mg/l of sodium hypochlorite for scale-inhibiting activity, and no decrease in scale-inhibiting activity was observed over the measurement period of 4 hours. When 0.4 mg/l of a mixture of sodium hypochlorite and sodium hypobromite in a weight ratio of 1:1 was added, 95% of the initial activity was still present after 4 hours.

Furthermore, in a cooling circuit having a cooling tower, the concentration of polyaspartic acid was tested without and with addition of 0.2 mg/l of chlorine in the form of sodium hypochlorite over one month: without chlorine addition, with daily doses of 20 to 50 mg/l of polyaspartic acid, a concentration of between 11 mg/l and 2 mg/l was established, and with chlorine addition a concentration of about 20 m/l was established.

A disadvantage of the mixtures of WO 97/39078 is the fact that the polymers used there react to a considerable extent with microbicides such as chlorine, bromine or halogen-releasing products, which is observable by a decrease in the biocide concentration.

It must be expected that owing to the reaction with the biocide, portions of polyaspartic acid are also destroyed, and that, as a result, the desired scale-inhibiting and/or corrosion-inhibiting activity is no longer achieved.

In many cases, although it would be possible to create a compensation at least to a certain extent by a higher dosage of the polyaspartic acid, the economic efficiency of the use of polyaspartic acid would suffer.

Therefore, the object of the present invention is to provide a composition for water treatment based on polymers containing repeating succinyl units, the components of which polymers remain stable over a long period, so that the use is economically justifiable, even in cooling circuits, especially in those having relatively long residence times.

DESCRIPTION

The object was achieved by means of the fact that polymers containing repeating succinyl units are mixed with biocidally acting oxidizing agents and, as stabilizer, unsubstituted or substituted amidosulphonic acid is added. The stabilizer here has the task of preventing or substantially reducing the reaction between polymer and oxidizing agent.

Although the use of ammonia, amines, amides or amidosulphonic acids as stabilizers for chlorine is disclosed by U.S. Pat. No. 4,711,724 and U.S. Pat. No. 3,170,883, and U.S. Pat. No. 4,642,194 describes the use of amidosulphonic acids and organic sulphonamides (EP-A 0 569 220) as stabilizers for specific phosphonic acids with respect to chlorine and U.S. Pat. No. 4,759,852 also with respect to bromine, the use of amidosulphonic acid and organic derivatives of amidosulphonic acid for stabilizing polyaspartic acid with respect to chlorine and bromine, has not previously been mentioned in the literature.

The high efficacy of amidosulphonic acid for stabilizing halogen with respect to polymers containing repeating succinyl units is surprising to those skilled in the art, since amide structures are present in the polymers themselves. The addition of a further amide should therefore give rise to the expectation of little activity. Surprisingly, by this means, the reaction between oxidizing biocide and polymer was considerably reduced.

The present invention therefore relates to the use of polymers containing repeating succinyl units, in particular polyaspartic acids, as compositions for water treatment in combination with a biocide and amidosulphonic acid $H_2NSO_3H$ or organic derivatives of amidosulphonic acid, and to the use of these compositions for water conditioning of cooling circuits.

The polymers used according to the invention have repeating succinyl units having one of the following structures:

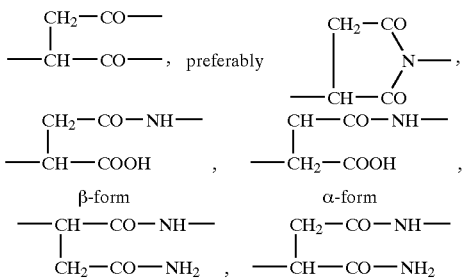

In addition, as a result of suitable reaction procedure and choice of starting materials, further repeating units can be present, e.g.

a) maleic acid units of the formula

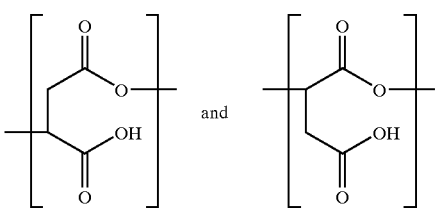

b) maleic acid and fumaric acid units of the formula

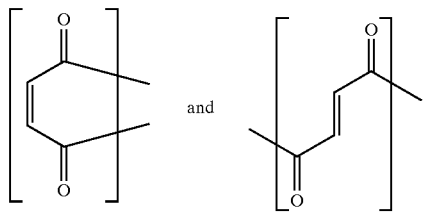

The chemical structure is preferably analysed by $^{13}$C-NMR, FT-IR and, after total hydrolysis, by HPLC, GC and GC/MS.

Many preparation processes produce not the pure acids, but initially the corresponding anhydrides, for example polysuccinimide (=PSI). Polymerization products of this type can be converted into a salt of PAA by reaction with a base in the presence or absence of water. This conversion of PSI polymers to PAA polymers takes place subsequently in a suitable apparatus by hydrolysis. Preference is given here to a pH between 5 and 14. Particularly preferably, a pH of 7 to 12 is selected, in particular by adding a base. Suitable bases are alkali metal hydroxides and alkaline earth metal hydroxides or alkali metal carbonates and alkaline earth metal carbonates, such as sodium hydroxide solution, potassium hydroxide solution, soda or potassium carbonate, ammonia and amines such as triethylamine, triethanolamine, diethylamine, diethanolamine, alkylamines etc. Particular preference is given, in addition to the free acids, to their Na, K or Ca salts.

The temperature during the hydrolysis is suitably in a range up to and including the boiling point of the PSI suspension and is preferably 20 to 150° C. The hydrolysis is carried out under pressure, if appropriate.

However, it is also possible to obtain the free polyaspartic acid by purely aqueous hydrolysis or treating the salt with acids or acidic ion-exchangers. The term "polyaspartic acid" (=PAA) for the purposes of the present invention likewise includes the salts, unless explicitly stated otherwise.

The final polyaspartic acid or the salts of polyaspartic acid are obtained by drying, preferably spray-drying.

Preferred polymers have a molecular weight, according to gel-permeation chromatography, of MW=500 to 10,000, preferably 700 to 5000, particularly preferably 1000 to 4500. Generally, the beta-form content is more than 50%, preferably more than 70%.

The concentration of the polyapartic acids to be used for the water treatment is usually approximately 0.5 to 100 mg/l of active compound in the aqueous phase, but mostly in the range from approximately 2 to 50 mg/l.

To achieve the object of the present invention, in addition, biocides are used. Preferably, use is made of biocidal oxidizing agents having a standard redox potential more positive than oxygen.

Standard redox potentials, also termed standard potentials, are generally known thermodynamic terms, which are described in textbooks of general or physical chemistry. An example which may be mentioned is chapter 11 of the textbook: H. R. Christen "Grundlagen der allgemeiften und anorganischen Chemie" [Principles of General and Inorganic Chemistry], Verlag Sauerländer-Salle, 1973. This textbook, on pages 692 to 697, contains a list of different standard potentials, which can also be found in many other textbooks and tabulations. The magnitude of the standard redox potential is usually expressed in volts.

Preferably, for the application according to the invention, oxidizing agents having a standard redox potential greater than 0.4 volts are used. Preferably, the oxidizing agent selected is hydrogen peroxide, chlorine, bromine, chlorine dioxide, hypochlorites, hypobromites or ozone. Since these chemicals in the presence of water can participate in acid-base reactions and/or disproportionation reactions, the abovementioned oxidizing agents are also taken to mean their reaction products with water.

The biocides are used in the compositions according to the invention for water treatment in concentrations of 0.05 to 20 mg/l. Preferably 0.05 to 10 mg/l, especially preferably 0.1 to 5 mg/l, of biocide are used.

As stabilizers of the biocides, use is made of unsubstituted or substituted amidosulphonic acids of the formula (I)

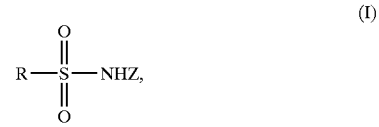

(I)

where
Z represents hydrogen, lithium, sodium, potassium, magnesium or calcium and
R represents an unsubstituted or substituted radical from the group consisting of OH, $C_1$–$C_4$-alkyl, $C_1$–$C_4$-alkoxy, amino, mono($C_1$–$C_4$-alkyl)amino, di($C_1$–$C_4$-alkyl)amino, formylamino, —NHC(O)$C_1$–$C_4$-alkyl, —NHC(O)O$C_1$–$C_4$-alkyl, $C_2$–$C_6$-alkenyl, $C_2$–$C_6$-alkinyl, $C_3$–$C_7$-cycloalkyl, unsubstituted or substituted phenyl, naphthyl, pyridyl, pyrimidyl, pyrazyl, pyridazyl, pyrrolyl, imidazolyl, pyrazolyl, triazolyl, tetrazolyl, suitable substituents in each case being: $C_1$–$C_4$-alkyl, $C_1$–$C_4$-alkoxy, $C_{1-C4}$-alkoxycarbonyl, halogen, nitro, nitrilo, carboxyl, —S(O)$_n$$C_1$–$C_4$-alkyl where n=2 and each of which is optionally substituted on the nitrogen by one or two $C_1^-$–$C_4$-alkyl groups, sulfamoyl, —SO$_2$N(R$^1$)R$^2$ where R$^1$ and R$^2$ each denote $C_1$–$C_4$-alkyl.

Preferably, use is made of an unsubstituted or substituted amidosulphonic acid of the formula (I) where R=OH, —$C_6H_4$—CH$_3$(tolyl) and OCH$_3$ and Z represents hydrogen, sodium and potassium.

In particular, preference is given to the amidosulphonic acid of the formula (I) where R represents OH and Z represents hydrogen.

The stabilizers are used in amounts of 0.02 to 15 mg/l. Preferably, 0.1 to 10 mg of stabilizer, in particular 0.2 to 5 mg of stabilizer, per l are used.

It is customary, and to be preferred for the purposes of the invention, that the water phase of the aqueous cooling system additionally comprises other components which can have an inhibitory action on corrosion or scale or a dispersive action. Those which may be mentioned by way of example are: 1 to 10 mg/l of zinc ions, 1 to 200 mg/l of monomeric or oligomeric molybdate ions, organic phosphates in a concentration such that the phosphorus content, calculated as phosphate, is in the a range 1 to 20 mg/l of phosphate, monomeric, oligomeric or polymeric inorganic phosphates at a concentration such that the phosphorus content, calculated as phosphate, is in the range 1 to 20 mg/l of phosphate, and nonferrous metal inhibitors, such as triazoles. As further anticorrosion components, the water phase can comprise known active compounds, such as alkanolamines, in particular triethanolamine, borates, sorbitol, nitrites, nitrates and silicates. As further additives having corrosion-inhibiting and/or dispersive action, use can be made of: phosphate esters, polyphosphoric esters, raminophosphates, aminomethylenephosphonic acids, phosphonates, in particular hydroxyalkanediphosphonic acids, hydroxyphosphonoacetic acid, aminoalkylenephosphonic acids, phosphonocarboxylic acids, succinamide, gluconates, polyoxycarboxylic acids and their copolymers, tannin derivatives, lignosuiphates, sulphonated condensation products of napthalene with formaldehyde, polyacrylates, polymethacrylates, polyacrylamides, polymaleates, copolymers of acrylic acid or methacrylic acid, maleic acid and acrylamnide, phosphinic-acid-containing homopolymers and copolymers of acrylic acid and acrylamnide, oligomeric phosphinosuccinic acid compounds, sulphomethylated or sulphoethylated polyacrylamides and copolymers or terpolymers with acrylic acid, maleic acid, N-butylacrylamide, acrylamidopropionosulphonic acid, maleic anhydride polymers and copolymers, phosphinoalkylated acrylamide polymers and copolymers with acrylic acid, citric acid, ethercarboxylates or oxidized carbohydrates.

To achieve an optimum corrosion protection, the water phase of the aqueous cooling systems is preferably adjusted to a pH in the range of about 7 to about 9. The biocidal oxidizing agents can be metered into the cooling system continuously or preferably batchwise in the form of an intermittent treatment.

The aqueous cooling systems can be through flow systems or open or closed circulation systems. The invention is designed particularly for use in open circuit systems, since it is especially suitable for counteracting the problems which occur in such systems of scale formation, the formation of deposits and/or biological contamination.

The compositions according to the invention can be used in a versatile manner, for example as scale inhibitors and also corrosion inhibitors and biocides. Fields of use of such compositions can be, for example: water treatment (e.g. treatment of cooling waters, process waters, gas scrubbing waters, injection waters in secondary oil extraction and water treatment in mining).

The present invention further relates to a process for water treatment which is characterized in that the composition according to the invention is introduced into the water to be treated.

The water treatment process is to be illustrated with reference to examples below:

For example, the compositions according to the invention are added to the feed water at concentrations between about 0.1 and 10 mg/l of active compound to prevent depositions and scales when used in cooling systems using fresh water cooling.

In cooling circuits, the additives are frequently metered rate-independently to the make-up water, for scale prevention and/or corrosion prevention. The concentrations are between about 1 and 100 mg/l of active compound in the circulating cooling water.

The invention is further described in the following illustrative examples in which all parts and percentages are by weight unless otherwise indicated.

EXAMPLE 1

In a clear glass flask, 1 l of cooling water having a total hardness of 3.0 mmol/l ($\hat{=}17°$ dGH [German degrees of total hardness]), of which 80 mol % is carbonate hardness, and $K_{S\ 4.3}$=3.2 mmol/l ($\hat{=}9°$ dKH [German degrees of carbonate hardness]) was admixed with 10 mg/l of sodium polyaspartate and 5 ml of a dilute bleaching liquor solution containing 1000 mg/l as chlorine. The pH was adjusted to 7.0 using hydrochloric acid, the flask was sealed and stored at room temperature for 24 h.

Similar samples were prepared having the following variants:

pH set to 8.5 by addition of sodium hydroxide solution,
addition of sodium bromide (1 mg/l Br)
addition of 5 mg/l of amidosulphonic acid.

After storage, the chlorine content in the samples was analysed (DPD method of Palin)*:

| No. | pH | Bromide content | Amidosulphonic acid content | Chlorine content after 24 h |
|---|---|---|---|---|
| 1 | 7.0 | 0 | 0 | 0.9 mg/l |
| 2 | 7.0 | 0 | 5 mg/l | 2.4 mg/l |
| 3 | 7.0 | 1 mg/l | 0 | 0.8 mg/l |
| 4 | 7.0 | 1 mg/l | 5 mg/l | 2.4 mg/l |
| 5 | 8.5 | 0 | 0 | 0.8 mg/l |
| 6 | 8.5 | 0 | 5 mg/l | 2.1 mg/l |
| 7 | 8.5 | 1 mg/l | 0 | 0.3 mg/l |
| 8 | 8.5 | 1 mg/l | 5 mg/l | 2.3 mg/l |

*Reference: M. Zimmermann (Editor) Photometrische Metall- und Wasseranalyse [Photometric analysis of metals and water], Wissenschaftl. Verlagsgesellschafi, Stuttgart 1974, Method B-C 1/3, variant 2: Determination of "total active chlorine", including chloramines Comments on Example 1:

Under pH conditions which are frequently encountered in cooling waters, the reaction of polyaspartic acid (10 mg/l as sodium salt) with bleaching liquor (5 mg/l as chlorine) were studied.

During storage at room temperature, as experiments Nos. 1 and 5 show, the bleaching liquor was >80% reacted, both at pH 7 and at pH 8.5, after 24 h; only 0.9 mg/l (pH 7) to 0.8 mg/l (pH 8), in each case measured as chlorine, were recovered.

The addition of bromide additionally intensifies the breakdown, especially at pH 8.5. [Bromide is oxidized under the experimental conditions present in this application from bleaching liquor to hypobromous acid whose biocidal action, especially at pH 8.5, is considerably stronger than that of the bleaching liquor.]

By adding amidosulphonic acid (Experiment Nos. 2, 4, 6, 8), under otherwise identical conditions, the reaction between polyaspartic acid and bleaching liquor (or, with addition of bromide, Experiment Nos. 4 and 8, in the additional presence of hypobromous acid) was considerably decreased: the residual contents of oxidizing agent are higher by a factor of 2.67 (comparison of Experiment Nos. 1 and 2) to 7.67 (comparison of Experiments 7 and 8).

Since the chemical reaction of chlorine with PAA, whose progress was measured in this application by the consumption of oxidizing agent, not only destroys the biocide, but presumably also the polymer, the degradation reaction is doubly harmful: the biocide added to protect the polymer from biodegradation is lost and can no longer protect the polymer and the polymer itself can no longer develop its desired activity (corrosion protection and scale protection).

EXAMPLE 2
(See Example 1 for Experimental Procedure)
Variant: Storage of the flasks at 60° C. for 24 h
Results:

| No. | pH | Bromide content | Amidosulphonic acid content | Chlorine content after 24 h |
|---|---|---|---|---|
| 1 | 7.0 | 0 | 0 | approximately 0.1 mg/l |
| 2 | 7.0 | 0 | 5 mg/l | 1.9 mg/l |
| 3 | 7.0 | 1 mg/l | 0 | approximately 0.1 mg/l |
| 4 | 7.0 | 1 mg/l | 5 mg/l | 2.5 mg/l |
| 5 | 8.5 | 0 | 0 | approximately 0.1 mg/l |
| 6 | 8.5 | 0 | 5 mg/l | 1.2 mg/l |
| 7 | 8.5 | 1 mg/l | 0 | approximately 0.1 mg/l |
| 8 | 8.5 | 1 mg/l | 5 mg/l | 1.8 mg/l |

Although the present invention has been described in detail with reference to certain preferred versions thereof, other variations are possible. Therefore, the spirit and scope of the appended claims should not be limited to the description of the versions contained therein.

What is claimed is:

1. A composition for water treatment comprising:
   a) biodegradable organic polymers having repeating succinyl units,
   b) a biocidal oxidizing agent, and
   c) an unsubstituted or substituted amidosulphonic acid, wherein the unsubstituted or substituted amidosulphonic acid is present in a concentration sufficient to prevent or substantially reduce the reaction between a) and b).

2. The composition of claim 1, wherein the amidosulphonic acid comprises $H_2NSO_3H$.

3. The composition according to claim 1, wherein the biodegradable organic polymers have repeating succinyl units of the structures selected from the group consisting of:

$$\begin{array}{c}CH_2-CO-\\|\\-CH-CO-\end{array},\quad \begin{array}{c}CH_2-CO\\|\quad\quad\quad N-\\-CH-CO\end{array},$$

$$\begin{array}{c}CH_2-CO-NH-\\|\\-CH-COOH\end{array},\quad \begin{array}{c}CH-CO-NH-\\|\\-CH_2-COOH\end{array},$$

β-form           α-form $$\begin{array}{c}-CH-CO-NH-\\|\\CH_2-CO-NH_2\end{array},\text{ and }\quad \begin{array}{c}CH_2-CO-NH-\\|\\-CH-CO-NH_2\end{array}.$$

4. The composition according to claim 1, wherein the biocidal oxidizing agent is hydrogen peroxide, chlorine, bromine, chlorine dioxide, hypochlorite, hypobromite or ozone; or a reaction product of: (i) a component selected from the group consisting of hydrogen peroxide, chlorine, bromine, chlorine dioxide, hypochlorite, hypobromite, and ozone; and (ii) water.

5. A composition for water treatment comprising:
   a) biodegradable organic polymers having repeating succinyl units
   b) a biocidal oxidizing agent, and
   c) an unsubstituted or substituted amidosulphonic acid, wherein the biodegradable organic polymers contain repeating units selected from the group consisting of the formulae:

$$\begin{array}{c}CH_2-CO-\\|\\-CH-CO-\end{array},\quad \begin{array}{c}CH_2-CO\\|\quad\quad\quad N-\\-CH-CO\end{array},$$

$$\begin{array}{c}CH_2-CO-NH-\\|\\-CH-COOH\end{array},\quad \begin{array}{c}CH-CO-NH-\\|\\-CH_2-COOH\end{array},$$

β-form           α-form $$\begin{array}{c}-CH-CO-NH-\\|\\CH_2-CO-NH_2\end{array},\text{ and }\quad \begin{array}{c}CH_2-CO-NH-\\|\\-CH-CO-NH_2\end{array}$$

and as additional units a₁) maleic acid units of the formula

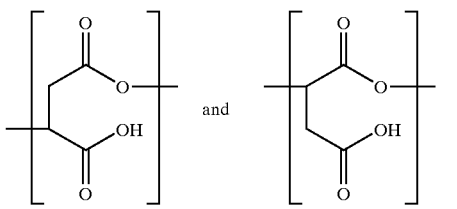

a₂) maleic acid and fumaric acid units of the formula

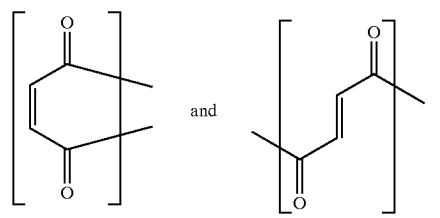

wherein the unsubstituted or substituted amidosulphonic acid is present in a concentration sufficient to prevent substantially reduce the reaction between a) and b).

* * * * *